April 6, 1965     J. C. BOOHER ETAL     3,176,453
GRASS CATCHER
Filed April 16, 1963     2 Sheets-Sheet 1
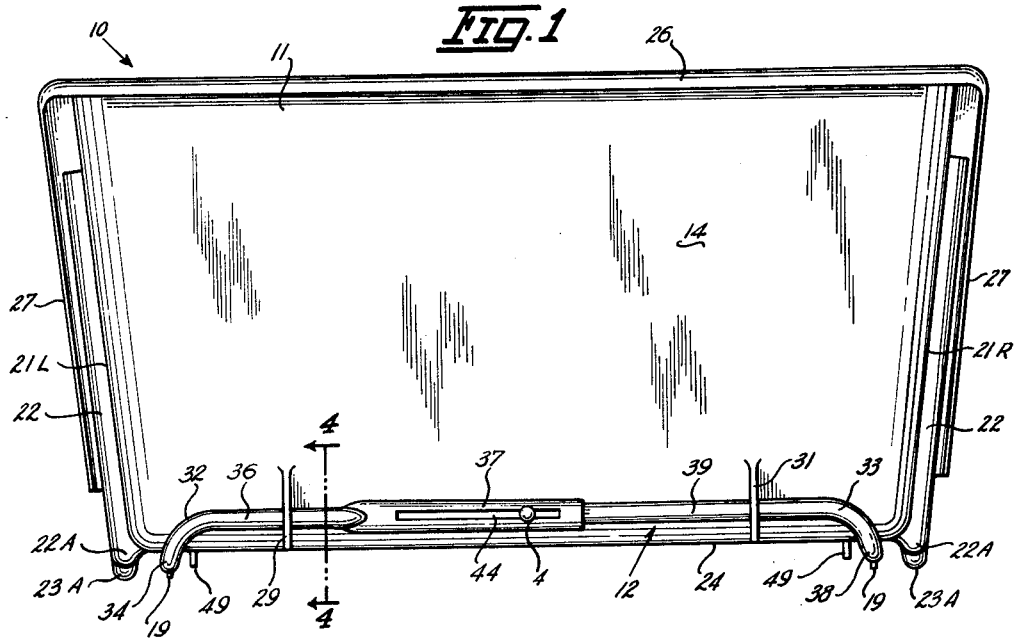
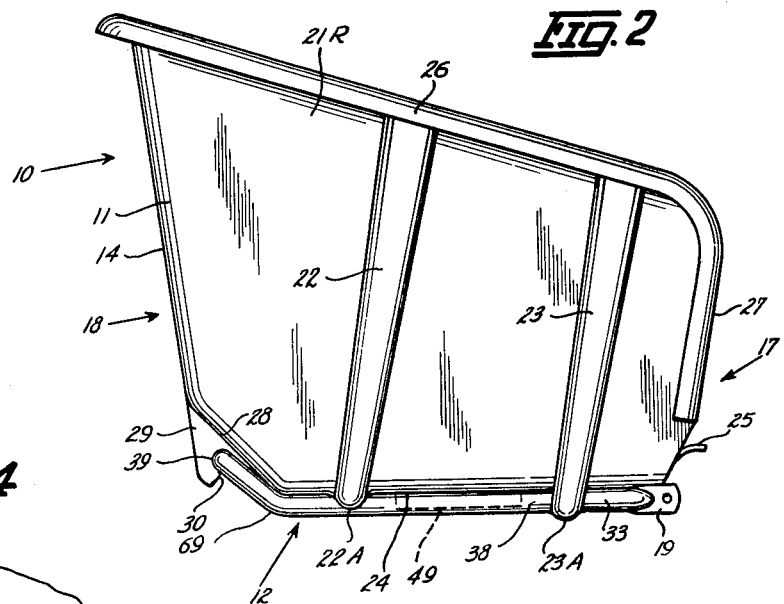
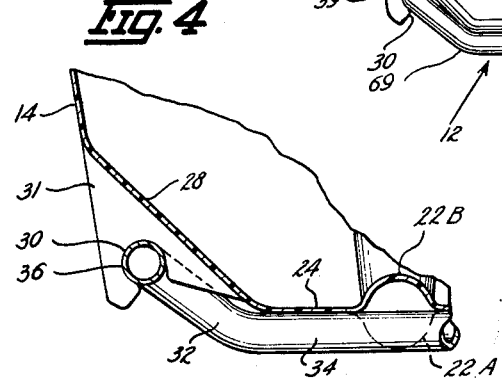
INVENTORS.
JACK C. BOOHER
WALTER J. LARSON
BY Dick, Zarley & Henderson
ATTORNEYS.

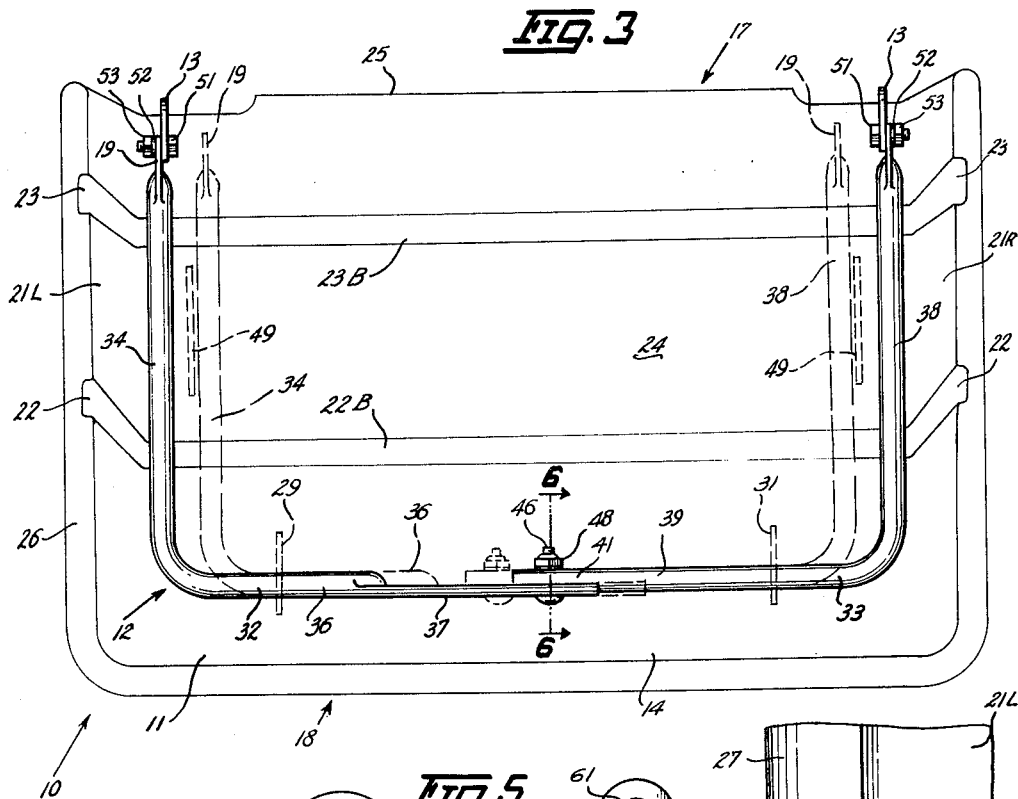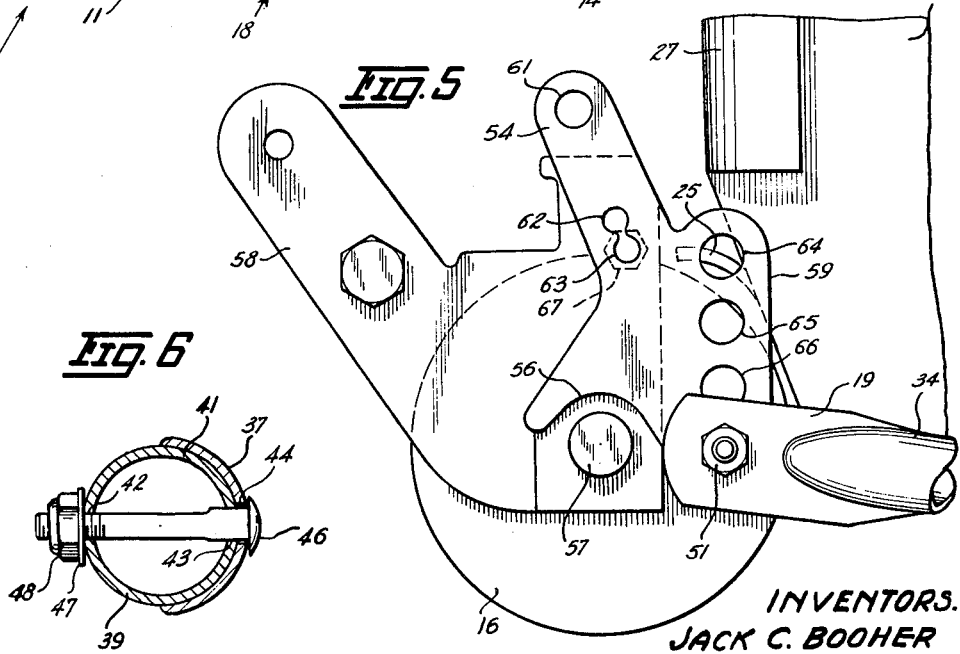

United States Patent Office 3,176,453
Patented Apr. 6, 1965

3,176,453
GRASS CATCHER
Jack C. Booher and Walter J. Larson, Des Moines, Iowa, assignors, by mesne assignments, to American Machine & Foundry Company, New York, N.Y., a corporation of New Jersey
Filed Apr. 16, 1963, Ser. No. 273,456
4 Claims. (Cl. 56—202)

This invention relates to apparatus for attachment to a prime mover for catching grass or the like thrown rearwardly from the prime mover, and more particularly to a grass catcher adapted for attachment to any conventional lawn mower.

It is an object of this invention to provide an improved grass catcher for use with a lawn mower.

It is another object of this invention to provide a grass catcher not subject to deterioration and rot from aging.

Yet another object of this invention is to provide a grass catcher attachable to a lawn mower, which during use tends to pile cut grass caught thereby into its rear end, compared to conventional grass catchers which tend to pile the cut grass in the front of the catcher.

Another object of this invention is to provide a grass catcher including a frame assembly readily attachable to any conventional lawn mower and transversely adjustable for varying its width, and including further a basket readily attachable to and detachable from the frame assembly.

Still another object of this invention is to provide a grass catcher including a molded basket, readily nested in another such basket, whereby the baskets are easily stacked and transported.

These objects, and other features and advantages of this invention will become readily apparent upon reference to the following description and the accompanying drawings, wherein:

FIG. 1 is a rear view of the grass catcher of this invention;

FIG. 2 is a side view of the grass catcher basket and frame assembly;

FIG. 3 is a top plan view of the grass catcher, with the basket shown in phantom, and showing the frame assembly in two transversely adjusted positions by the use of full and dotted lines;

FIG. 4 is an enlarged, fragmentary sectional view taken along the lines 4—4 in FIG. 1;

FIG. 5 is an enlarged fragmentary side elevational view of one of the brackets for connecting the frame assembly to the lawn mower; and FIG. 6 is an enlarged, fragmentary sectional view taken along the line 6—6 in FIG. 3.

Referring now to the drawings, the grass catcher of this invention is indicated generally at 10 in FIG. 1, and comprises basically a basket 11, a frame assembly 12 for supporting the basket 11, and a pair of identical brackets 13 (FIG. 3) each securable to any conventional lawn mower as the prime mover, and to which the frame assembly 12 is connected.

The basket 11 is comprised of polyethylene or like material and is manufactured by the injection mold type process, having substantially a 0.115 inch thickness. It is realized thus, that as compared to the conventional removable canvas basket or bag, the basket 11 is not subject to deterioration or rot from aging.

From FIGS. 1, 2 and 3, it is seen that the basket 11 has a substantially rectangular form in top and bottom views. The rear wall 14 (FIGS. 1 and 2) is substantially flat and rectangular, and as best seen in FIG. 2 extends angularly upwardly and away, or to the rear of the basket 11. For the purpose of convenience, the end of the basket adjacent the lawn mower (see the roller 16 of the mower in FIG. 5) shall be termed the front 17, and the opposite end the rear 18. It should be pointed out here that FIG. 2 showing the basket 11 and frame assembly 12 is a substantially level non-attached position. When the free ends 19 (FIGS. 2 and 5) of the frame assembly 12 are secured to the brackets 13, the front end 17 of the grass catcher 10 will be raised, with the rear end 18 engaging the ground.

Extended forwardly from both ends of the rear wall 14 are a pair of identical side walls 21L and 21R, which form with the rear wall 14 the shape of a U. Like the rear wall 14, the side walls 21L and 21R slant downwardly and inwardly (see FIG. 1), however they are otherwise different in that each is provided with a pair of concave, elongated, substantially parallel ribs 22 and 23 (FIGS. 2 and 3). Each rib extends the entire height of a side wall and depends at the base 22A and 23A slightly below the level of the bottom wall 24 of the basket 11 (FIG. 1).

Referring to FIG. 2, it is seen that the width of each rib 22 and 23 tapers from top to bottom, and that both ribs extend angularly forward approximately ten degrees. The ribs, therefore, have a two-fold purpose in that they not only act to strengthen the side walls 21L and 21R, but they also serve to guide baskets together in nested relationship for stacking purposes. It is also seen that each side is higher in the rear than at the front and that a curved flange 26 extends outwardly and downwardly from the top of the rear and side walls 14 and 21R and 21L. The flange 26 also has a portion 27 (FIGS. 1 and 2) curved outwardly and rearwardly. Similarly to the ribs 22 and 23, the flange portions 27 aid in the nesting of a plurality of baskets. The substantially horizontal flange 26 is used primarily for handling the basket 11.

The bottom wall 24 (FIGS. 1 and 3) is substantially flat, except for a convex continuation 22B and 23B (FIG. 4) extended transversely thereacross of both the side wall ribs 22 and 23 for stiffening purposes. At its forward edge, an upwardly and forwardly curved lip 25 (FIGS. 3 and 5) is provided. As best viewed in FIGS. 2 and 4, a short, flat back wall portion 28 extends at approximately a forty five degree angle upwardly and rearwardly from the rear of the bottom wall 24 to the base of the rear wall 14.

Integral with and extended rearwardly from the back wall portion 28 are a pair of fins 29 and 31 (FIGS. 1 and 4). The parallel, transversely spaced fins are substantially vertically disposed, and each has a cut-out 30 formed in the lower edge thereof, with the entrance of each cut-out being slightly narrower than the diameter thereof, for a reason hereinafter discussed.

To support the basket 11 on the ground and to connect it to the lawn mower, the frame assembly 12 is provided. The assembly is a two piece unit including a left hand L-shaped tube 32 and a right hand L-shaped tube 33. The tube 32 (FIGS. 1, 3 and 4) comprises a forward portion 34 and a rear portion 36 the end 37 (FIGS. 3 and 6) of which has a semi-circular formation. Similarly, the right hand tube 33 comprises a forward portion 38 and a rear portion 39 extended inwardly for adjustable connection to the left hand tube end 37.

The inner end 41 (FIG. 6) of the tube end 39 is circular so as to fit in a complementary manner within the semi-circular confines of the left hand tube end 37. A pair of diametrically opposed openings 42 and 43 are formed in the right hand tube end 41 and are adapted for registration with an elongated slot 44 (FIGS. 1 and 6) formed in the left hand tube end 37. A shoulder bolt 46, lockwasher 47, and nut 48 are used to secure the ends 37 and 41 together in a telescopic manner, whereby upon a slight untightening of the bolt 46, etc., the left and right hand tubes are movable transversely relative to each other in order to vary the position of their free ends 19 (FIGS. 2, 3 and 5) to be secured to one of many conventional lawn mowers.

As viewed in FIGS. 1 and 3, the solid line position of the frame assembly 12 discloses that the forward tube portions 34 and 38 ar bracceted on the inner side by the base protrusions 22A and 23A of the ribs 22 and 23, and on the outside by an elongated stop member 49. The stop members 49 are parallel (FIG. 3) and transversely spaced, and depend from the bottom wall 24 (FIG. 1) a distance substantially equal to the diameter of each forward portion. Referring particularly to FIG. 3, the dotted line position of the frame assembly 12 shows the forward portions 34 and 38 disposed inside the stop members 49. Thus in either position, the full line position accommodating a conventional twenty-one inch mower, and the dotted line position for an eighteen inch mower, the frame assembly 12 maintains the basket 11 against transverse or sidewise movement during use.

The free end 19 (FIG. 5) of each forward portion 34 and 38 is pivotally attached by a screw 51 (FIG. 3), nut 52, and washer 53 to each bracket 13. As best shown in FIG. 5, each bracket 13 comprises a flat plate of an irregular shape, including an arm 54 extended upwardly and forwardly, an arch position 56, and a rear portion 59. The semi-circular arch portion extends about the end 57 of a shaft joined in a mounting plate 58 for supporting the roller 16. The plate 58 is a part of the lawn mower. An opening 61 is formed in the arm 54, at the outer end thereof, a pair of interconnected openings 62 and 63 are formed in the inner end of the arm 54, and a plurality of vertically spaced holes 64, 65 and 66 are formed in the rear portion 59.

To assembly the grass catch 10, the brackets 13 are first secured each by at least one bolt 67 (FIG. 5) through either an opening or a hole formed therein to the mounting plate 58. The arch portion 56 is thus disposed above the roller shaft end 57 so that should the bolt 67 become slightly loosened, rotational movement of the bracket 13 is limited by its striking the shaft end 57. The frame assembly 12 is then adjusted to fit the lawn mower to which it is being attached with the forward portions 34 and 38 properly spaced. They are then pivotally connected to the brackets 13 (FIG. 5) by the pivot screw 51.

In making this connection, the forward end of the frame assembly 12 at the ends 19 thereof is raised off the ground, such that the frame assembly 12 is tilted to where the rear end 69 (FIG. 2) of each portion 34 and 38 is the only part of the frame assembly 12 that engages the ground during normal usage of the grass catcher 10. It should be noted here that the rear portions 36 and 39 are raised from the side portions 34 and 38 sufficiently to enable their attachment to the fins 29 and 31 so that the latter do not engage the ground during usage.

The basket 11 is then placed on and secured to the frame assembly 12 by sliding it longitudinally onto the tubular forward portions 34 and 38 so that they are properly located either on the inside or the outside of the stop members 49, and until the fins 29 and 31 engage the respective rear portions 36 and 39 at the cut-outs 30. As mentioned hereinbefore, the neck width for each cut-out 30 is slightly smaller than the diameter of the cut-out, and which neck width is also slightly smaller than the diameter of the rear portions 36 and 39. Thus, as the fins 29 and 31 are thin and flexible, by pushing downwardly on the flange 26 at the top of the rear wall 14, the fins 29 and 31 will flex sufficiently to force the rear portions 36 and 39 into the cut-outs 30 where they have a friction fit, permitting however pivotal movement of the basket 11 about the rear portions.

In use, as the lawn mower is of necessity a reel type, the cut grass is thrown over the lip 25 (FIGS. 2 and 5) and into the grass catcher basket 11. As the basket is not attached at its front to the lawn mower, which is usually the case with conventional grass catchers, but is pivotally connected at its rear to the frame assembly 12, with the front of the basket therefore free, it is found that as the basket is moved forward in use, the front end is kicked up now and then, depending on the ground surface, about the connections at the fins 29 and 31.

Thus, rather than the conventional basket which tends to keep pushing the cut grass forwardly in the basket until it spills over the front edge, the basket 11 of this invention tends to push the cut grass toward the rear of the basket interior. This action provides for greater utilization of the basket's capacity to hold cut grass, and obviates the usual continual stopping of the mowing operation so that the operator can bend over to pull the cut grass back into the rear of the basket to provide for more room at the front to receive additional cuttings.

When it is desired to remove the basket 11 from the frame assembly 12, the flexability of the molded basket 11 and the fins 29 and 31 enable the operator to push down on the flange 26 at one side of the basket 11 while pulling up on the other side. The basket 11 is thus slightly contorted to enable one fin to be pulled out of engagement with its rear portion, whereupon the other fin can then be also pulled away from its rear portion.

In summation, a grass catcher has been described herein which includes a basket of a molded design particularly adapted for prolonged life and for economical storing and transportation; wherein in use the grass catcher as a unit is readily attached to and detached from a reel-type lawn mower; the basket is readily removed for dumping the cuttings, and just as easily re-assembled; and wherein in use the cuttings thrown into the basket are continually moved to the rear of the basket due to the structural arrangement of the grass catcher.

Some changes may be made in the construction and arrangement of our grass catcher without departing from the real spirit and purpose of our invention, and it is our intention to cover by our claims, any modified forms of structure or use of mechanical equivalents which may be reasonably included within their scope.

We claim:
1. In combination with a lawn mower having a frame and rearwardly throwing grass cutting means, a grass catcher comprising
   (1) a U shaped supporting structure formed of a pair of L shaped members, each having an arm and a base section at a right angle thereto, said base sections being telescopically connected whereby said arms are transversely movable relative to each other,
   (2) means for adjustable fastening the free ends of said arms to the frame of the lawn mower to permit the rear end portion thereof to skid on the ground surface to the rear of said grass cutting means,
   (3) a basket having a self-supporting rear, side and bottom walls, said walls being contoured to permit said basket to seat upon said supporting structure in a position to receive grass cuttings as said mower is operated.

2. The invention according to claim 1 wherein the means for fastening the ends of the arms to the frame comprise a bracket mounted on the frame on either side of the grass cutting means, said bracket having a plurality of vertically spaced openings formed therein for adjustable attachment of the arms.

3. In combination with a lawn mower having a frame and rearwardly throwing grass cutting means, a grass catcher comprising
   (1) a U shaped supporting structure having a pair of parallel arms and a connecting base section,
   (2) means for fastening the ends of said arms to the frame of the lawn mower to permit the rear end portion thereof to skid on the ground surface to the rear of said grass cutting means,
   (3) a basket having self-supporting rear, side and bottom walls, and an open top and an open end opposite said rear wall, said walls being contoured to permit said basket to seat upon said supporting structure in a position to receive grass cuttings as said mower is operated, said basket being further provided with downwardly projecting hook members adapted to secure about the base section of said supporting structure to permit pivotal movement for emptying of said basket.

4. In combination with a lawn mower having a frame and rearwardly throwing grass cutting means, a grass catcher comprising (1) a U shaped tubular supporting structure formed of a pair of L shaped members each having an arm and a base section at a right angle thereto, said base sections being telescopically connected whereby said arms are transversely movable relative to each other, (2) means for adjustably fastening the free ends of said arms to the frame of the lawn mower to permit the rear end portion thereof to skid on the ground surface to the rear of said grass cutting means, (3) a molded plastic basket having a self-supporting rear, side and bottom walls, and an open top and an open end opposite said rear wall, said walls being contoured to permit said basket to seat upon said supporting structure in a position to receive grass cuttings as said mower is operated, said basket being further provided with downwardly projecting fins having a hook portion adapted to secure about the base sections of said supporting structure to permit pivotal movement of said basket for emptying thereof.

References Cited by the Examiner
UNITED STATES PATENTS 2,862,346  12/58  Anderson _____ 56—194

T. GRAHAM CRAVER, *Primary Examiner.*

RUSSELL R. KINSEY, *Examiner.*